(12) United States Patent
Meier et al.

(10) Patent No.: US 10,486,879 B2
(45) Date of Patent: Nov. 26, 2019

(54) BLISTER PACK FOR BUTTON BATTERY

(71) Applicant: Renata AG, Itingen (CH)

(72) Inventors: Thomas Meier, Zeglingen (CH); Eric Weber, Gelterkinden (CH); Urs Renggli, Thervil (CH)

(73) Assignee: Renata AG, Itingen (CH)

( * ) Notice: Subject to any disclaimer, the term of this patent is extended or adjusted under 35 U.S.C. 154(b) by 18 days.

(21) Appl. No.: 15/745,748

(22) PCT Filed: Jul. 21, 2016

(86) PCT No.: PCT/EP2016/067370
§ 371 (c)(1),
(2) Date: Jan. 18, 2018

(87) PCT Pub. No.: WO2017/013196
PCT Pub. Date: Jan. 26, 2017

(65) Prior Publication Data
US 2018/0215520 A1  Aug. 2, 2018

(30) Foreign Application Priority Data

Jul. 21, 2015  (EP) .................................. 15177676

(51) Int. Cl.
*B65D 75/36* (2006.01)
*B65D 85/68* (2006.01)

(52) U.S. Cl.
CPC .......... *B65D 75/366* (2013.01); *B65D 85/68* (2013.01); *B65D 2585/88* (2013.01)

(58) Field of Classification Search
CPC ...... B65D 75/32; B65D 75/327; B65D 75/36; B65D 75/366; B65D 75/367; B65D 85/68; B65D 85/88; B65D 2582/88; B65D 2585/88

USPC ................. 206/461–471, 703, 704
See application file for complete search history.

(56) References Cited

U.S. PATENT DOCUMENTS

| 4,211,326 A * | 7/1980 | Hein | B65D 75/327 206/461 |
| 6,439,390 B1 * | 8/2002 | Kumakura | B65D 75/327 206/469 |
| 6,968,950 B2 * | 11/2005 | Eisenbraun | B65D 75/36 206/461 |

(Continued)

FOREIGN PATENT DOCUMENTS

| DE | 87 04 853 U1 | 7/1987 |
| EP | 2 595 74 A2 | 3/1988 |

OTHER PUBLICATIONS

International Search Report dated Sep. 20, 2016, in PCT/EP2016/067370 filed Jul. 21, 2016.

*Primary Examiner* — Byron P Gehman
(74) *Attorney, Agent, or Firm* — Oblon, McClelland, Maier & Neustadt, L.L.P.

(57) ABSTRACT

The invention relates to a blister pack (1) for a button battery, comprising a blister foil (4) designed to form at least one housing for receiving at least one button battery, and integral with a base (2). According to the invention, the blister pack comprises, between the base (2) and the blister foil (4), a reinforcing foil (6) which has inter alia a tensile strength of between 1,200 kg/cm² and 3,100 kg/cm² according to the ASTM D 882 standard. Moreover, an orifice opening into the hosung is provided.

10 Claims, 1 Drawing Sheet

(56) References Cited

U.S. PATENT DOCUMENTS

| | | | |
|---|---|---|---|
| 9,079,698 B2 * | 7/2015 | Safarik | ............... B65D 75/367 |
| 2003/0205500 A1 | 11/2003 | Schein et al. | |
| 2004/0149615 A1 | 8/2004 | Eisenbraun | |
| 2005/0274537 A1 | 12/2005 | Eisenbraun | |

* cited by examiner

BLISTER PACK FOR BUTTON BATTERY

CROSS REFERENCE TO RELATED APPLICATIONS

This is a National phase Application in the United States of International Patent Application PCT/EP2016/067370 filed on Jul. 21, 2016 which claims priority on European patent application No. 15177676.2 filed on Jul. 21, 2015. The entire disclosures of the above patent applications are hereby incorporated by reference.

FIELD OF THE INVENTION

The present invention relates to a pack of the blister type for a button battery, comprising a blister foil designed to form at least one housing for receiving at least one button battery, and integral with a base.

BACKGROUND OF THE INVENTION

It is known to propose selling button batteries in blister packs. Such packs basically consist of a base which is integral via one face with a transparent foil made of thermoformed plastic material so as to form a housing for receiving the button battery. The front face and the rear face of the base generally include text, such as information relating to the brand, to the reference, to the conditions of use of the product, and also safety-related texts written in several languages or preferably standard pictograms relating to safety.

In some embodiments, the base can be a flexible foil which closes the blister. The battery is accessible by separating the flexible foil from the blister by peeling. The flexible foil is designed to be separated easily from the blister so that it is simple for a child to pull back the flexible foil in order to gain access to the button battery and to risk swallowing it. Furthermore, in order to make the assembly sufficiently rigid, the blister generally has, at the sides, reinforcing ribs. For this reason, the pack has thicknesses which make it necessary to leave spaces between the packs when they are stacked, hence resulting in a loss of space.

In other embodiments, the base can likewise have the shape of a card which has, at the level of the housing of the button battery, an orifice about which precut weakened lines are distributed, forming for example a cross. The card must be squashed by pressing at the level of these weakened lines in order to be able to extract the button battery from its housing. This operation can be achieved easily by a child, with the risk that the child gains access to the button battery and swallows it. Furthermore, the card is a material which has the disadvantage of being able to be torn easily. In particular, when the blister occupies only a central part of the surface of the card, the outside edges of the card can be torn easily, even by a child, which can cause accidental access to the button battery.

It is therefore necessary to propose a new blister pack for button batteries which offers better security and prevents in particular any accidental opening by a child.

SUMMARY OF THE INVENTION

To this end, the present invention relates to a pack of the blister type for a button battery, comprising a blister foil designed to form at least one housing for receiving at least one button battery, and integral with a base.

According to the invention, the blister pack comprises, between the base and the blister foil, a reinforcing foil which has a tensile strength of between 1,200 kg/cm$^2$ and 3,100 kg/cm$^2$ according to the ASTM D 882 standard.

Advantageously, the reinforcing foil covers at least the outside edges of the base, and preferably substantially all of the surface of the base.

In some embodiments, the base can include, at least on the side of the blister foil, printings, the reinforcing foil being transparent, or the base can be neutral in colour on the side of the blister foil, the reinforcing foil comprising printings.

The base and the reinforcing foil can have, facing, an orifice which opens into the housing, said orifice preferably having a circular shape.

Thus, the blister pack according to the invention has great stability so that any access to the button battery simply by pressing on the pack or by manipulating the pack, in particular by a child, is made impossible. Only use of a tool, such as scissors, will make it possible to destroy the blister pack and to gain access to the housing of the button battery. Furthermore, the blister pack is sufficiently rigid not to require reinforcing ribs so that it is flat. For this reason, the blister packs according to the invention can be stacked without loss of space.

BRIEF DESCRIPTION OF THE DRAWINGS

The aims, advantages and features of the present invention will appear more clearly in the following detailed description of at least one embodiment of the invention, given solely by way of example, in a non-limiting manner and illustrated by the annexed drawings in which.

DETAILED DESCRIPTION OF THE INVENTION

Figure 1:
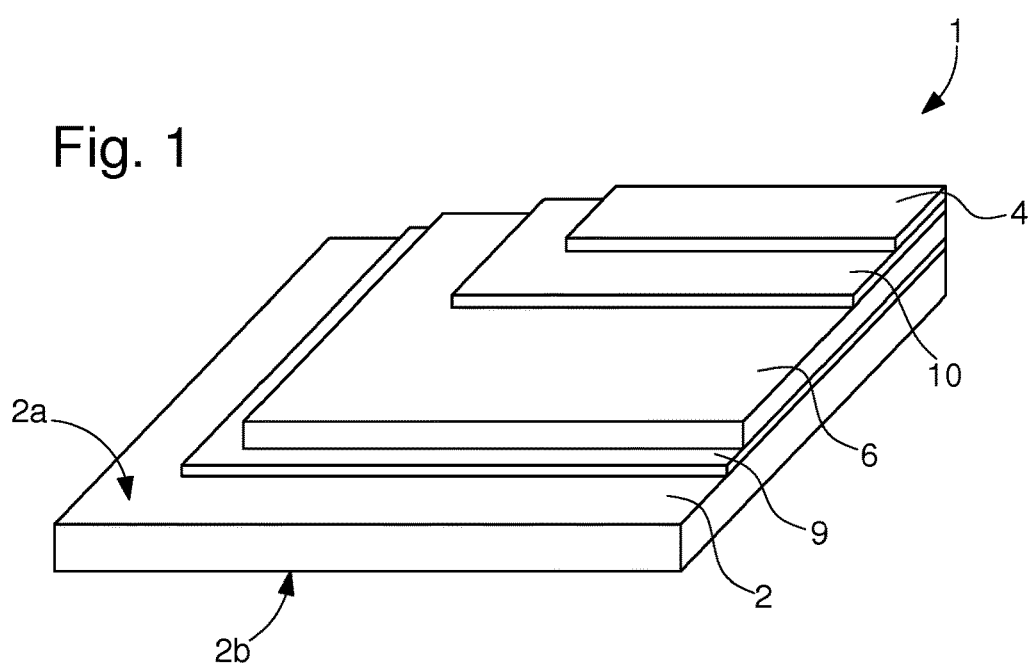
FIG. 1 illustrates schematically an exploded view of a blister pack according to the invention.
Figure 2:
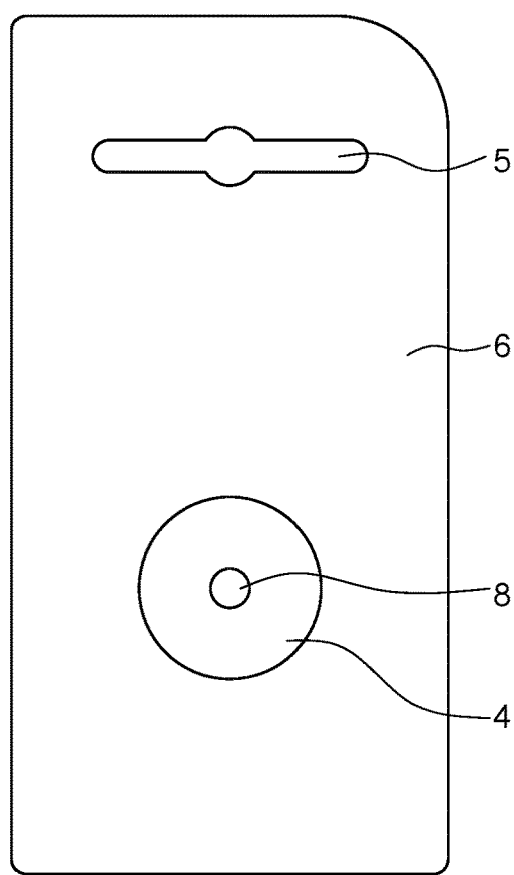
FIG. 2 is a view from above of a blister pack according to the invention.

Referring to FIG. 1, the blister pack 1 comprises a base 2, integral on the side of the front face 2a thereof, with a transparent foil, termed blister foil 4, made of thermoformed plastic material so as to form a cup which forms a housing for receiving at least one button battery. The base 2 is preferably made of card. The card is advantageously a card foil of a thickness between 200 µm and 500 µm, preferably between 250 µm and 400 µm. The card preferably has a weight between 150 g/m$^2$ and 600 g/m$^2$, and more preferably between 300 g/m$^2$ and 400 g/m$^2$. The rear face 2b of the base 2 generally comprises text, such as information relating to the brand, to the reference, to the conditions of use of the product, a bar code, and also safety-related texts written in several languages or preferably standard pictograms relating to safety. The front face 2a of the base 2, on the side of the blister film 4, can be neutral in colour, devoid of any text, or can comprise text, such as the brand or the product reference. The base 2 has a cut-out 5 which makes it possible to hang the blister pack on a display unit. The blister foil 4 is preferably made of thermoformable polyethylene terephthalate, and has for example a thickness between 200 µm and 300 µm.

According to the invention, there is provided, between the base 2 and the blister foil 4, a reinforcing foil 6 which has a tensile strength of between 1,200 kg/cm$^2$ and 3,100 kg/cm$^2$, and preferably between 1,800 kg/cm$^2$ and 2,500 kg/cm$^2$ according to the ASTM D 882 standard.

Advantageously, the reinforcing foil 6 likewise has an elongation at break between 100% and 170%, preferably between 120% and 150% according to the ASTM D 882 standard.

According to a first embodiment, the reinforcing foil 6 covers at least the outside edges of the base 2, in order to prevent tearing of the pack via its outside edges. According to another preferred embodiment, the reinforcing foil 6 has the same dimensions as the base so that it covers substantially all the surface of the base 2 so as to cover at least the outside edges of the base 2 and also the circumference of the orifice 8 and of the cut-out 5 as will be described hereafter.

Preferably, the reinforcing foil 6 is produced in a material chosen from the group comprising polyethylene terephthalates, polyethylenes, such as Tyvek®, and polyvinyl chlorides.

In a particularly preferred manner, the reinforcing foil 6 is a polyethylene terephthalate, having undergone bi-axial stretching. Preferably, the reinforcing foil 6 is glossy. It can be transparent if the front face 2a of the base 2 includes printings or includes printings if the front face 2a of the base 2 is neutral in colour.

The reinforcing foil 6 has a thickness preferably between 15 μm and 50 μm, preferably between 20 μm and 30 μm.

In order to ensure fixing of the reinforcing foil 6 on the front face 2a of the base 2, an adhesive layer 9 is provided between the base 2 and the reinforcing foil 6. This adhesive is a standard adhesive, such as a dispersion, which is used in standard fashion and known to the person skilled in the art. The adhesive layer 9 can have a thickness between 3 μm and 7 μm. In order to improve the adhesion of the reinforcing foil 6 on the base 2, the face of the reinforcing foil 6 facing the base 2 can have undergone a surface treatment of the corona type.

In order to ensure fixing of the blister foil 4 on the reinforcing foil 6, a seal coating 10 is provided between the reinforcing foil 6 and the blister foil 4. This seal coating is preferably a standard thermoactive seal coating, known to the person skilled in the art, used for thermowelding. The seal coating 10 can have a thickness between 2 μm and 5 μm. The blister foil 4 can be fixed in standard fashion on the reinforcing foil 6 by a contact surface by thermowelding, at temperatures between 150° C. and 300° C. Obviously any other adequate assembly technique can be used.

In order to allow dissipation of the heat during thermowelding of the blister foil 4 and to allow also flow of air for allowing for both pressure and moisture compensation, the base 2 and the reinforcing foil 6 have, facing, at least one venting orifice 8 opening into the housing formed by the blister foil 4. The orifice 8 advantageously has a circular shape so as not to have a weakened zone. The orifice preferably has dimensions, and more particularly a diameter, between 1 mm and 6 mm. No precut slit is provided around the orifice 8, the contours of which are further reinforced by the reinforcing foil 6. Thus, it is not possible to tear the pack at the level of the orifice 8 nor to extract the button battery by simply pressing on the blister pack.

The blister pack according to the invention has great stability, preventing any tearing both via the outside edges and via the orifice 8. Thus, it is not possible to extract the button battery from its pack by means of simple manipulation. A tool, such as scissors, will be necessary in order to destroy the blister pack and to gain access to the button battery. The blister pack according to the invention is therefore particularly safe with respect to any accidental opening, by a child in particular. Furthermore, the blister pack according to the invention is sufficiently rigid that it does not need to be reinforced by reinforcing ribs. For this reason, the base of the blister pack according to the invention is flat, which allows stacking of the blister packs according to the invention without loss of space.

The invention claimed is:

1. A blister pack for a button battery, comprising:
a blister foil designed to form at least one housing for receiving at least one button battery,
a base integrated with the blister foil, and
a reinforcing foil placed between the base and the blister foil,
wherein the reinforcing foil has a tensile strength of between 1,200 kg/cm$^2$ and 3,100 kg/cm$^2$ and an elongation at break comprised between 100% and 170% according to the ASTM D 882 standard,
each of the base and the reinforcing foil has at least one orifice opening into the at least one housing, such that the at least one orifice of the base and the reinforcing foil face each other,
the at least one orifice has contours reinforced by the reinforcing foil, and
the at least one orifice prevents the button battery from being extracted by simply pressing on the blister pack.

2. The blister pack according to claim 1,
wherein the reinforcing foil covers at least outer edges of the base.

3. The blister pack according to claim 2,
wherein the reinforcing foil covers substantially all of a surface of the base.

4. The blister pack according to claim 1,
wherein the reinforcing foil comprises a material chosen from the group consisting of a polyethylene terephthalate, a polyethylene, and a polyvinyl chloride.

5. The blister pack according to claim 1,
wherein the blister pack further comprises:
an adhesive layer between the base and the reinforcing foil, and
a seal coating between the reinforcing foil and the blister foil.

6. The blister pack according to claim 1,
wherein the base comprises, at least on a side of the blister foil, a printing, and
the reinforcing foil is transparent.

7. The blister pack according to claim 1,
wherein the base is neutral in color on a side of the blister foil, and
the reinforcing foil comprises a printing.

8. The blister pack according to claim 1, wherein the base is a card foil of a thickness between 200 μm and 500 μm.

9. The blister pack according to claim 1, wherein the at least one orifice has a circular shape.

10. The blister pack according to claim 9, wherein the at least one orifice has a diameter between 1 mm and 6 mm.

* * * * *